C. E. AKELEY.
COMBINED FINDING AND FOCUSING DEVICE FOR CAMERAS.
APPLICATION FILED AUG. 3, 1914.
1,159,731.
Patented Nov. 9, 1915.
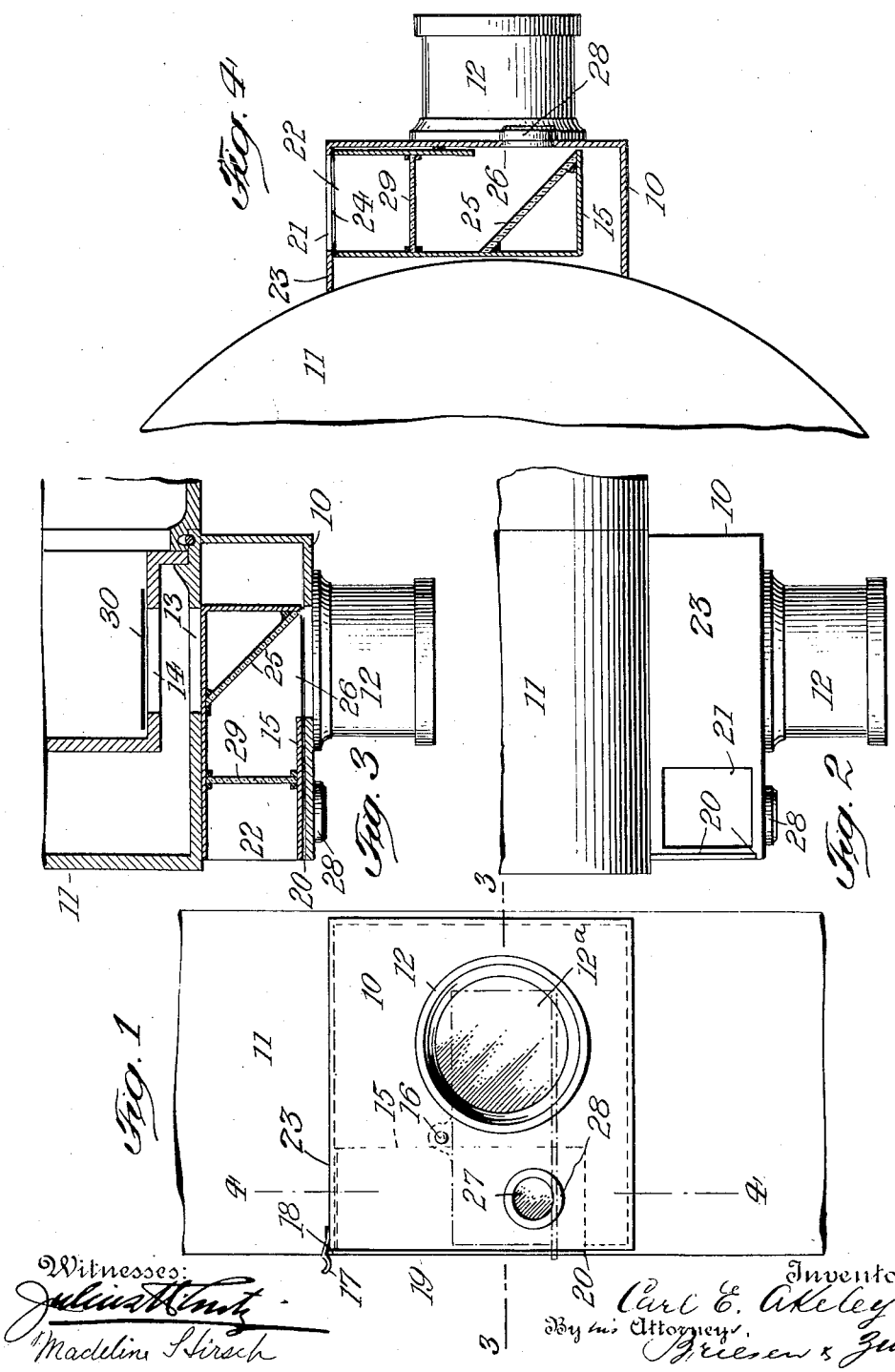

UNITED STATES PATENT OFFICE.

CARL E. AKELEY, OF NEW YORK, N. Y., ASSIGNOR TO AKELEY CAMERA, INC., OF NEW YORK, N. Y., A CORPORATION OF NEW YORK.

COMBINED FINDING AND FOCUSING DEVICE FOR CAMERAS.

1,159,731. Specification of Letters Patent. Patented Nov. 9, 1915.

Application filed August 3, 1914. Serial No. 854,776.

*To all whom it may concern:*

Be it known that I, CARL E. AKELEY, a citizen of the United States, and residing in New York city, county and State of New York, have invented certain new and useful Improvements in Combined Finding and Focusing Devices for Cameras, of which the following is a specification.

This invention relates to a novel device for finding and focusing the objects to be photographed in an effective, quick and simple manner, the device being more particularly designed to be used in conjunction with a moving picture camera such as described in a co-pending patent application filed by me August 3rd, 1914, under Serial Number 854,777.

In the accompanying drawing: Figure 1 is a front view of a combined finding and focusing device embodying my invention; Fig. 2 a top view thereof; Fig. 3 a section on line 3—3, Fig. 1 and Fig. 4 a section on line 4—4, Fig. 1.

The device comprises a rectangular casing 10 forming part of a camera 11 and provided with a tube 12 containing the photographic lens or lenses 12ª which are axially alined with corresponding film-exposing openings 13, 14 of the camera 11. Within casing 10 is contained an oblong box 15 pivoted thereto as at 16 and normally occupying the position shown in Fig. 4 and in dotted lines in Fig. 1, in which position it is shown to be maintained by a spring catch 17 engaging the protruding rim 18 of the side wall 19 of box 15. The casing 10 is provided at its side with a cutout or opening 20 and at its top with an opening 21, which latter opening is adapted to register with the open outer end 22 of box 15. Wall 19 is adapted to be snugly received by cutout 20 in which position the box 15 abuts with its end 22 against the top plate 23 of casing 10 thus forming a light-tight closure for casing 10, which tightness may be increased by providing a suitable packing or lining 24 between the box and casing walls if so desired.

At its inner end, box 15 is provided with an oblique reflector or mirror 25 set at an angle of 45 degrees to the axis of the lens tube. Opposite this mirror, the front wall of box 15 is cut out as at 26 to permit the finding lens 27 inclosed in tube 28, to throw an image of the objects in front of the camera, on mirror 25. This image is reflected by the mirror upon a matted glass plate or screen 29 extending across box 15. The picture thus thrown upon screen 29 may be readily observed by the operator through the opening 21 of casing 10 and through the alined open end 22 of box 15, so that by the construction described effective means are provided for finding the objects to be photographed. In order to properly focus these objects, the box 15 is swung from the position shown in Figs. 1 and 4 into that shown in Fig. 3 and by dot and dash lines in Fig. 1. In this way, mirror 25 is brought opposite lens tube 12 so that now the picture of the object received through said lens tube is thrown upon screen 29. In order to permit a proper focusing by means of this screen, the distance between the matted face thereof and the center of mirror 25 should equal the distance between said center and the light sensitive face of the film 30 or other object to be exposed. It is thus obvious that if the lenses of tube 12 are so set as to produce a sharp picture upon screen 29 a likewise sharp picture will subsequently be produced upon film 30. After the object has thus been focused, box 15 is returned to the position shown in Fig. 4 thereby clearing the space between the lens 12ª and the film to permit the proper taking of the pictures.

I claim:

1. A combined finding and focusing device for cameras, comprising a photographic lens, a finding lens, and an oblique reflector adapted to be brought into axial alinement with either the photographic lens or the finding lens.

2. A combined finding and focusing device for cameras, comprising a photographic lens, a finding lens, an oblique reflector adapted to be brought into axial alinement with either the photographic lens or the finding lens, and an image-receiving screen extending at an angle to said reflector.

3. A combined finding and focusing device for cameras, comprising a photographic lens located opposite a light sensitive object, a finding lens, an oblique reflector adapted to be brought into axial alinement with either the photographic lens or the finding lens, and an image-receiving screen extending at an angle to said reflector, the distance between the center of the reflector and the light-sensitive object being equal to that between said center and screen.

4. A combined finding and focusing device for cameras, comprising a casing forming part of a camera and having a pair of openings, a photographic lens and a finding lens carried by the casing, an oblique reflector adapted to be brought into axial alinement with either the photographic lens or the finding lens, and a screen extending at an angle to the reflector and observable through either of the casing-openings.

5. A combined finding and focusing device for cameras, comprising a casing forming part of a camera and having a pair of openings, a photographic lens and a finding lens carried by the casing, a box inclosed within the casing and pivoted thereto, and oblique reflector contained within the box, and a screen also contained within the box and observable through either of the casing-openings.

CARL E. AKELEY.

Witnesses:
ARTHUR E. ZUMPE,
MADELINE HIRSCH.